United States Patent
Goodwin et al.

[19]

[11] Patent Number: 6,162,001
[45] Date of Patent: *Dec. 19, 2000

[54] ANTI-CROSS THREADING FASTENER

[76] Inventors: Jerry J. Goodwin, 5998 Runnymeade, Canton, Mich. 48187; Michael A. Garver, 6147 Winans Dr., Brighton, Mich. 48116; Anthony L. Snoddy, 1972 Bancroft, Ann Arbor, Mich. 48108

[ * ] Notice: This patent is subject to a terminal disclaimer.

[21] Appl. No.: 09/428,032

[22] Filed: Oct. 27, 1999

Related U.S. Application Data

[63] Continuation of application No. 09/192,776, Nov. 16, 1998, Pat. No. 5,997,231, which is a continuation of application No. 09/006,078, Jan. 12, 1998, Pat. No. 5,836,731, which is a continuation of application No. 08/859,660, May 20, 1997, Pat. No. 5,791,849, which is a continuation of application No. 08/645,058, May 13, 1996, abandoned, which is a continuation-in-part of application No. 08/505,031, Jul. 21, 1995, abandoned.

[51] Int. Cl.$^7$ .................................................. F16B 25/00
[52] U.S. Cl. ............................ 411/386; 411/411; 411/423
[58] Field of Search ........................... 411/386, 308–311, 411/411, 412, 423, 436

[56] References Cited

U.S. PATENT DOCUMENTS

| | | |
|---|---|---|
| 447,775 | 3/1891 | Higbee . |
| 2,005,672 | 6/1935 | Chaffee et al. . |
| 2,021,704 | 11/1935 | Thatcher et al. . |
| 3,352,190 | 11/1967 | Carlson . |
| 3,586,353 | 6/1971 | Lorenz et al. . |
| 4,084,829 | 4/1978 | Fälchle et al. ............................ 279/99 |
| 4,179,976 | 12/1979 | Sygnator .................................. 411/423 |
| 4,549,754 | 10/1985 | Saunders et al. ........................ 411/423 |
| 4,658,088 | 4/1987 | Gartland, Jr. et al. ................... 411/411 |
| 4,789,288 | 12/1988 | Peterson . |
| 4,815,907 | 3/1989 | Williamson et al. .................... 411/107 |
| 4,820,098 | 4/1989 | Taubert et al. . |
| 4,907,930 | 3/1990 | Peterson ................................. 411/437 |
| 4,915,560 | 4/1990 | Peterson et al. ........................ 411/386 |
| 4,952,110 | 8/1990 | Avgoustis et al. . |
| 4,973,209 | 11/1990 | Essom et al. . |
| 4,983,084 | 1/1991 | Gray ....................................... 411/311 |
| 5,259,398 | 11/1993 | Vrespa .................................... 128/898 |
| 5,304,022 | 4/1994 | Huska .................................... 411/386 |
| 5,320,467 | 6/1994 | Erbes . |
| 5,419,667 | 5/1995 | Augoustis et al. ...................... 411/386 |

FOREIGN PATENT DOCUMENTS

| | | |
|---|---|---|
| 3909725 C1 | 3/1989 | Germany . |
| 36-15116 | 6/1961 | Japan . |
| 49-104866 | 10/1974 | Japan . |
| 52-22865 | 2/1977 | Japan . |
| 52-141562 | 4/1977 | Japan . |
| 55-179218 | 12/1980 | Japan . |
| 60-139910 | 7/1985 | Japan . |
| 1-182613 | 7/1989 | Japan . |

OTHER PUBLICATIONS

Jun. 1994 NAO Engineering, *Materials and Fastening*, General Motors Corporation.
Jan. 1994 General Motors Engineering Standards, P Points for Metric Bolts.
Jul. 1992 General Motors Engineering Standards, Dog Points for Metric Bolts.
Jul. 20, 1989 Japanese Publication of Unexamined Patent Application.
1981 Abstract of ANSI/ASME, Slotted and Cross Recessed Head Tapping Screws.

*Primary Examiner*—Teri Pham
*Attorney, Agent, or Firm*—Baker Botts L.L.P.

[57] ABSTRACT

A self-aligning, anti-cross threading fastener having first and/or second members with lead threads having a curved surface feature from the minor diameter to the major diameter which allows the surface of the lead threads to cam over the mating threads of the other member and thereby aligning collinearly the longitudinal axis of the two members. The initial presentation angle of the two threaded members may be restricted and therefore enhanced by providing a protruding diameter feature.

21 Claims, 7 Drawing Sheets

ANTI-CROSS THREADING FASTENER

CROSS REFERENCE TO RELATED PATENT APPLICATION

This application is a continuation of U.S. Application Ser. No. 09/192,776, filed Nov. 16, 1998, now U.S. Pat. No. 5,997,231, which is a continuation of U.S. Application Ser. No. 09/006,078, filed Jan. 12, 1998, now U.S. Pat. No. 5,836,731, which is a continuation of U.S. Application Ser. No. 08/859,660, filed May 20, 1997, now U.S. Pat. No. 5,791,849, which is a continuation of U.S. Application Ser. No. 08/645,058, filed May 13, 1996, now abandoned, which is a continuation-in-part of U.S. Application Ser. No. 08/505,031, filed Jul. 21, 1995, now abandoned.

BACKGROUND OF THE INVENTION

1. Field of the Invention

The present invention relates to threaded fasteners such as screws, bolts and nuts, and more particularly, to anti-cross threading fasteners.

2. Description of the Related Technology

Threaded fastener technology is basic to the construction or fabrication of most articles of manufacture such as machines, automobiles, trains, plains, engines, and the like. Threaded fasteners may be bolts, screws, studs, rods, or other substantially round members having uniform, non-uniform or tapered external helical threads that are screwably engaged into mating threaded fasteners such as nuts, bolts or holes having substantially matching internal helical threads. For proper engagement of the externally and internally threaded fasteners, the longitudinal axis of the externally threaded member must be substantially collinear with the longitudinal axis of the mating internally threaded member. When the externally threaded member is not substantially collinear with the internally threaded member, cross-threading occurs.

Cross-threading generally occurs when there is a misalignment between the externally threaded member, typically a screw or bolt, and the internally threaded member, typically a nut or other threaded hole. Specifically, cross-threading is the result of the threads of the two members attempting to engage at least one half pitch out of alignment. When this situation happens, the two members are not collinear with each other and wedging of the threads will occur as the threaded helixes are rotated against each other. If rotation continues, then threads on one or both members will be structurally damaged.

What is needed is a fastener that prevents cross-threading when an externally threaded member engages an internally threaded member.

SUMMARY OF THE INVENTION

It is therefore an object of the present invention to prevent cross-threading when an externally threaded member engages an internally threaded member.

Another object is to correct misalignment (non-collinearity) between two screwably attachable members having mating helical threads thereon.

Another object of the present invention is to easily correct misalignment that may cause cross threading of a threaded fastener.

Yet another object of the present invention is to correct misalignment between a first fastening member and a second fastening member by having one or more threads of the first member cam over the threads of the second member, thereby bringing the first and second members into collinear alignment.

Still another object is to use a protruding diameter feature at one end of the first member to restrict the misalignment angle between the two members.

In an embodiment of the present invention, a self alignment anti-cross threading fastener comprises a substantially round first member such as, for example, a bolt or screw, having an external helically wound thread on the shank of the first member. At one end of the first member shank is a head adapted to be engaged by a means for applying rotational torque. The head may be slotted to receive a flat, Phillips, Torx head and the like screwdriver blade, or may have a plurality of flat surfaces parallel with the longitudinal axis of the first member shank for receiving a wrench, socket or other means for rotationally engaging the head.

At the other end of the first member shank, the first preferably at least one helical thread has a transitionally curved surface from the minor diameter to the major diameter. The transitional curved surface of the first at least one helical thread of the first member is adapted to cam over the mating component threads of the second member when in a cross-threading position, thereby collinearly aligning the first and second members together.

In another embodiment of the invention, the end of the first member opposite the head may have a protruding diameter feature, commonly referred to as a dog point. This protruding diameter feature restricts the range of presentation angles when the first member is inserted into the second member. Thus, the inherent misalignment may be restricted so that the first at least one helical thread having the transitionally curved surface may easily cam over the mating component threads so as to rapidly bring the two members into the correct collinear alignment wherein the remaining threads of the first and second members rotationally engage to properly fasten as intended. The curved surface on the transitional threads may be formed by rolling the threads in a rolling die having a mirror image contour of the curved surface desired on the threads. The transitional thread curved surface may also be formed on the threads by cutting, furnishing, grinding, machining, polishing, laser, or any combination thereof In still another embodiment of the present invention, at the end of the first member opposite the head, the first preferably at least one external helical thread has a transitional curved surface, or any combination of curved and/or flat surfaces approximating the shape defined by the curved surface, from the curve forming the minor diameter to the localized major diameter. The major diameter being defined as the outermost point of the helical thread in any localized axial section. The thread surface of the first at least one transitional thread is thus adapted to cam over the mating component threads of the second member when in a cross threading condition, thereby collinearly aligning the first and second members together.

In another embodiment of the present invention, at the end of the first member opposite the head, the first preferably at least one external helical thread has a truncated thread profile, approximating the shape formed by a radius drawn tangent to both thread flanks at their intersection with the curve forming the minor diameter. The minor diameter being defined as the innermost point of the helical thread in any localized axial section. The peak of the truncated thread may be flat or curved and may be parallel to, or angled in relation to the screw thread axis. The thread surface of the first at least one transitional thread is thus adapted to cam over the mating component threads of the second member when in a cross threading condition, thereby collinearly aligning the first and second members together.

In a further embodiment of the present invention, a self aligning, anti-cross-threading fastener comprises a nut or other threaded member, having a helically wound thread on the interior of the member. The first preferably at least one internal helical thread has a transitional curved surface, or any combination of curved and/or flat surfaces approximating the shape defined by the curved surface, from the curve forming the major diameter to the localized minor diameter. The minor diameter being defined as the innermost point of the helical thread in any localized axial section. The thread surface of the first at least one transitional thread is thus adapted to cam over the mating component threads of the second member when in a cross threading condition, thereby collinearly aligning the first and second members together.

In another embodiment of the present invention, a self aligning, anti-cross-threading fastener comprises a nut or other threaded member, having helically wound threads on the interior of the member. The first preferably at least one internal helical thread has a truncated thread profile, approximating the shape formed by a radius drawn tangent to both thread flanks at their intersection with the curve forming the major diameter. The major diameter being defined as the outermost point of the helical thread in any localized axial section. The peak of the truncated thread may be flat or curved and may be parallel to, or angled in relation to the screw thread axis. The thread surface of the first at least one transitional thread is thus adapted to cam over the mating component threads of the second member when in a cross threading condition, thereby collinearly aligning the first and second members together.

In another embodiment of the invention, there is provided an anti-cross-threading fastener comprising a substantially round shank member having first and second ends and a continuous helix comprised of a plurality of threads around a circumference of the shank member. At least one thread of the plurality of threads is proximate the first end of the shank member and has an outside diameter and a surface; the remaining plurality of threads have a major diameter. The outside diameter of the at least one thread is smaller than the major diameter of the remaining plurality of threads, and the surface of the at least one thread approximates a shape defined by a curve extending from a curve forming the minor diameter to about the pitch diameter of the remaining plurality of threads.

A feature of the present invention is a transitional curved surface from the minor diameter to the major diameter of the first at least one external thread of a first member, whereby the external thread surface area cams over the mating component threads of a second member and thereby collinearly realigns the first and second members together.

Another feature of the present invention is a protruding diameter feature, commonly referred to as a dog point, for restricting the presentation engagement angle of the two members.

Another feature is a self aligning, anti-cross-threading fastener having helically wound threads on the interior of the fastener.

Another feature is the transitional curved surface of at least one of the helical threads comprising any combination of curved and/or flat surfaces approximating the shape defined by the curved surface, from the curve forming the major diameter to the localized minor diameter.

An advantage of the present invention is a reliable and simple way of preventing cross-threading of a threaded fastener.

Another advantage is quick and reliable collinear alignment of a threaded fastener when rotatably engaging the threaded fastener by machine or unskilled labor.

Other and further objects, features and advantages will be apparent from the following description from the presently preferred embodiment of the invention, given for the purpose of disclosure and taken in conjunction with the accompanying drawings.

DETAILED DESCRIPTION OF THE PREFERRED EMBODIMENT

Figure 1A:
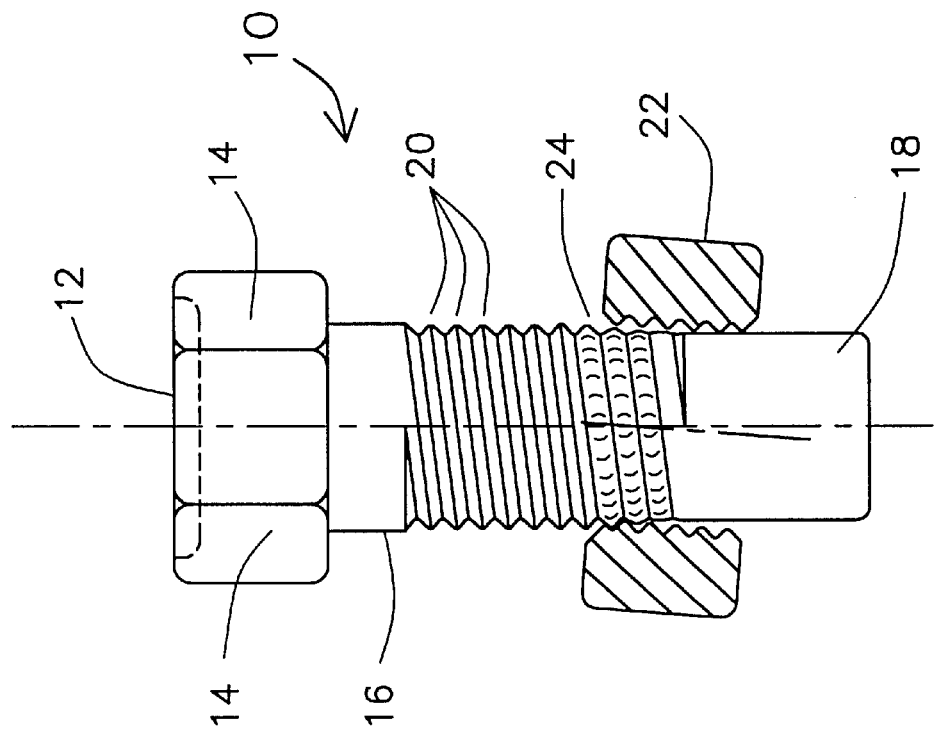
FIGS. 1A–1D illustrate schematic elevational views of a preferred embodiment of the present invention at various stages of threading engagement.

The present invention is an anti-cross threading fastener having a self alignment feature that is new, novel and non-obvious over the related technology. In the present invention, when the opposing thread helixes address each other, there is a natural tendency to collinearly align their respective mating planes during rotation. By providing at least one of the lead threads with a transitional curved surface feature from the minor diameter to the major diameter of the threads, any misalignment of the threads will cause the at least one lead thread surface to cam over the mating component thread and thus realign. The initial presentation angle of the mating component threads may be restricted and thereby reduce the misalignment angle by providing a protruding diameter feature before the transitional threads.

Referring now to the drawings, the details of the preferred embodiment of the invention are schematically illustrated. Like elements are numbered the same, and similar elements are represented by the same number and a different lower case letter suffix. Referring now to FIGS. 1A–1D, schematic elevational views of the present invention at various stages of threading engagement are illustrated. A threaded fastener bolt is illustrated and generally designated by the reference numeral 10. The threaded bolt 10 comprises a head 12 having flat faces 14, a threaded shank 16, and a protruding diameter member opposite the head 12, commonly referred to as a dog point 18.

The head 12 is adapted to be engaged by a tool (not illustrated) for applying rotational torque to the bolt 10. A plurality of faces 14 on the head 12 provide flat surfaces adapted to receive and provide a non-slip surface for the tool such as a wrench, socket, pliers and the like. The head 12 may also be slotted to receive a screwdriver blade (flat, Phillips, Torx, etc.). It is the intent of the invention to encompass all adaptations for imparting rotational torque to the bolt 10. In addition, the invention may be utilized with any type of threaded fastener such as, for example, a bolt, screw, stud, rod or other substantially round member having a uniform, non-uniform or tapered external helical thread that can be screwably engaged into a mating member such as a nut, bolt or hole having a substantially matching internal helical thread. The mating member (nut illustrated in cross section) is generally represented by the numeral 22.

FIG. 1A illustrates the initial installation of the bolt 10 and nut 22 at a maximum misalignment condition. The dog point 18 restricts the angular misalignment of the helical threads on the shank 16 and the nut 22. The dog point 18 is optional and may be absent for short bolts or shallow threaded holes with a blocked bottom. The dog point 18 diameter preferably may be 90 percent of the minor inside diameter of the nut 22 and approximately one nominal size diameter of the shank 16 in length.

Figure 1B:
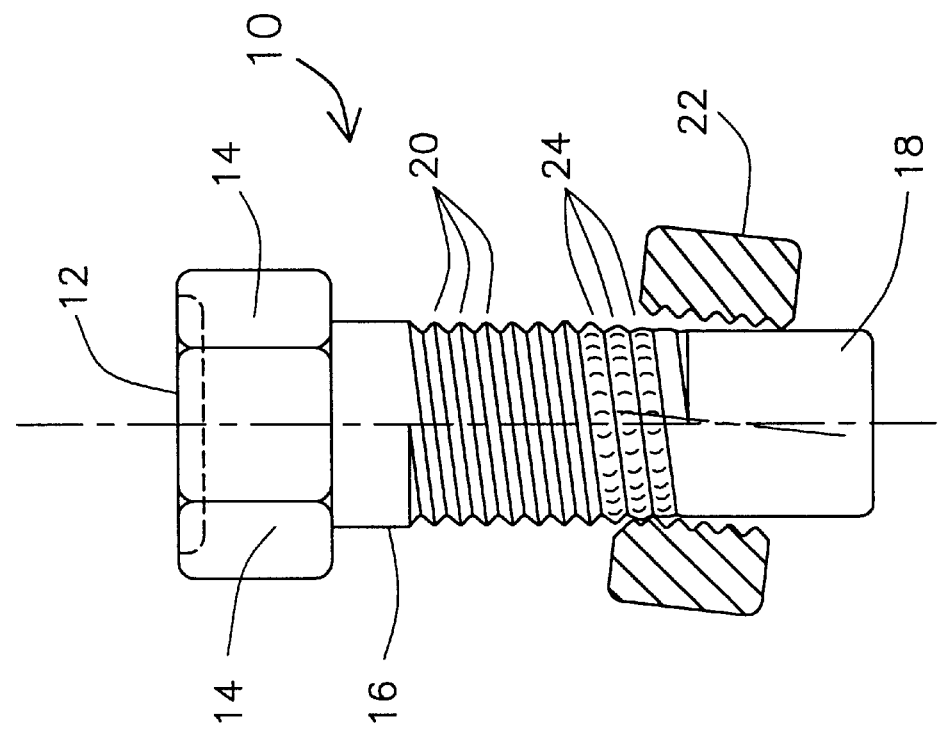

FIG. 1B illustrates the relative angular position between the bolt 10 and nut 22 after an initial 360 degree rotation. As illustrated, the first and second transitional threads 24 are engaging the left mating threads (of the sectional view) of the nut 22 and the curved surfaces on the threads 24 cam over the right mating threads (of the sectional view) on the nut 22.

Figure 1D:
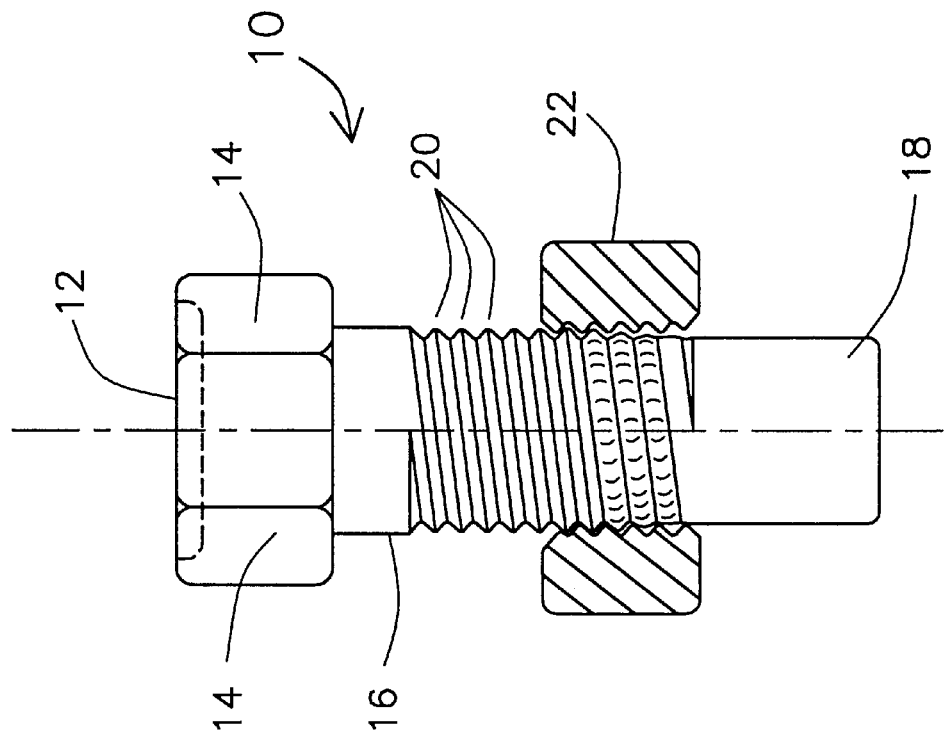
Figure 1C:
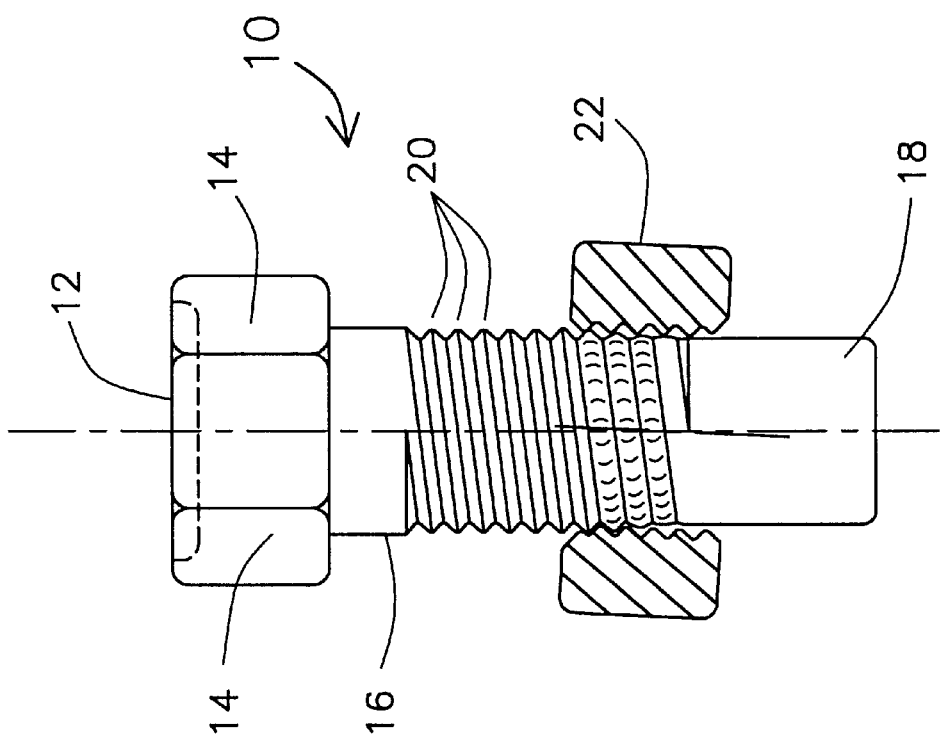

FIG. 1C illustrates the engagement of the threads 24 with the mating threads of the nut 22 after two full rotations (720 degrees). It can be seen that the threaded helixes of the bolt 10 and nut 22 have forced their respective planes to align and the axis of both the bolt 10 and nut 22 to become collinear. As a result, the threads 20 are no longer positioned to become cross-threaded with the mating threads of the nut 22.

FIG. 1D illustrates full and proper engagement of the bolt 10 and nut 22 in a correct collinear alignment so that there is no possibility that the threads 22 can wedge against the mating threads of the nut 22 to become cross-threaded. An advantage of the present invention is its ability to prevent cross-threading by unskilled workers or by automatic insertion and fastening machines that may be out of adjustment.

Figure 2A:
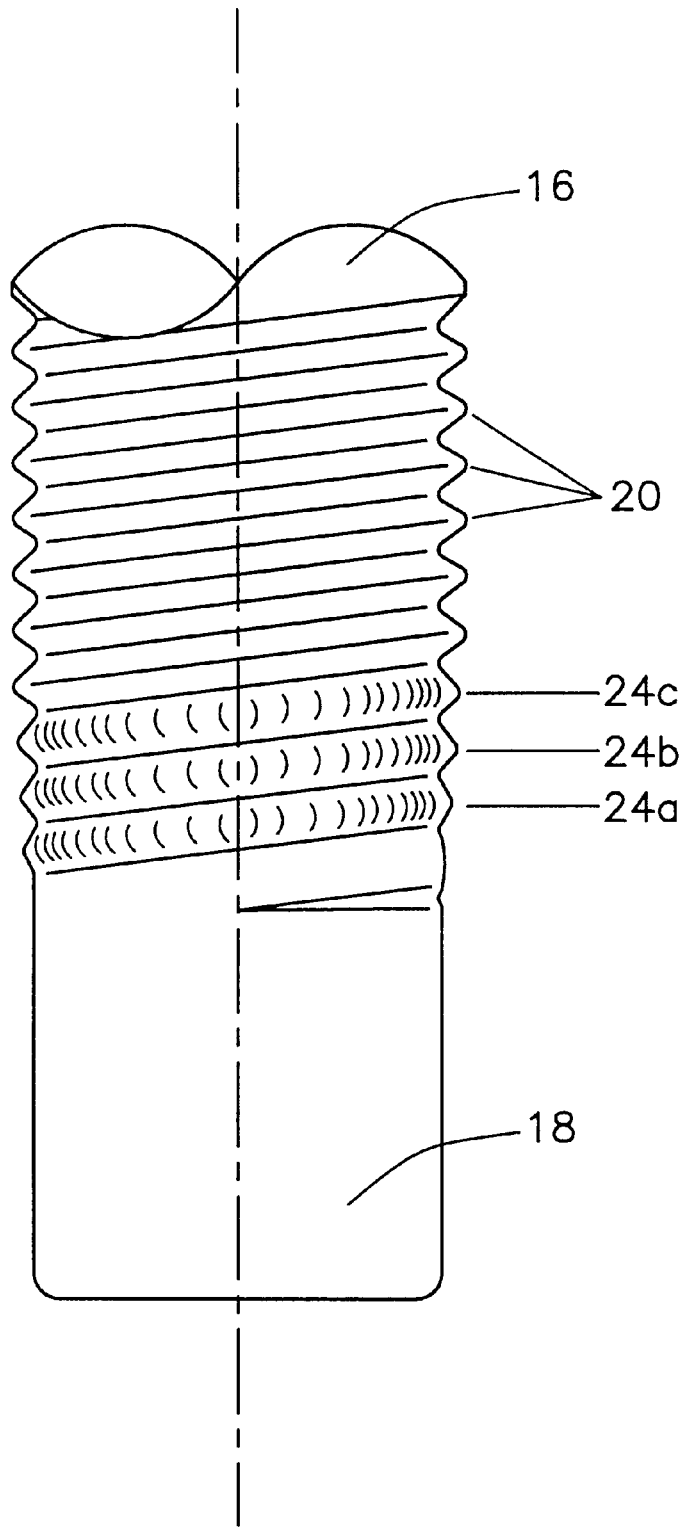
FIG. 2A illustrates a schematic elevational view of external threads according to the present invention of FIG. 1A–1D.

Referring now to FIG. 2A, a schematic elevational partial view of the threaded shank 16 of FIGS. 1A–1D is illustrated. The shank 16 has threads such as standard machine threads and at least two transitional threads 24 toward the end of the shank 16 opposite the head 12. The dog point 18 is also illustrated but is not required for all configurations of the present invention. Three transitional threads 24a, 24b and 24c are illustrated. Only one transitional thread 24a is necessary for operation of the present invention, however, two or more threads, 24a, 24b, etc., may also be used with equally good results.

Figure 2B:
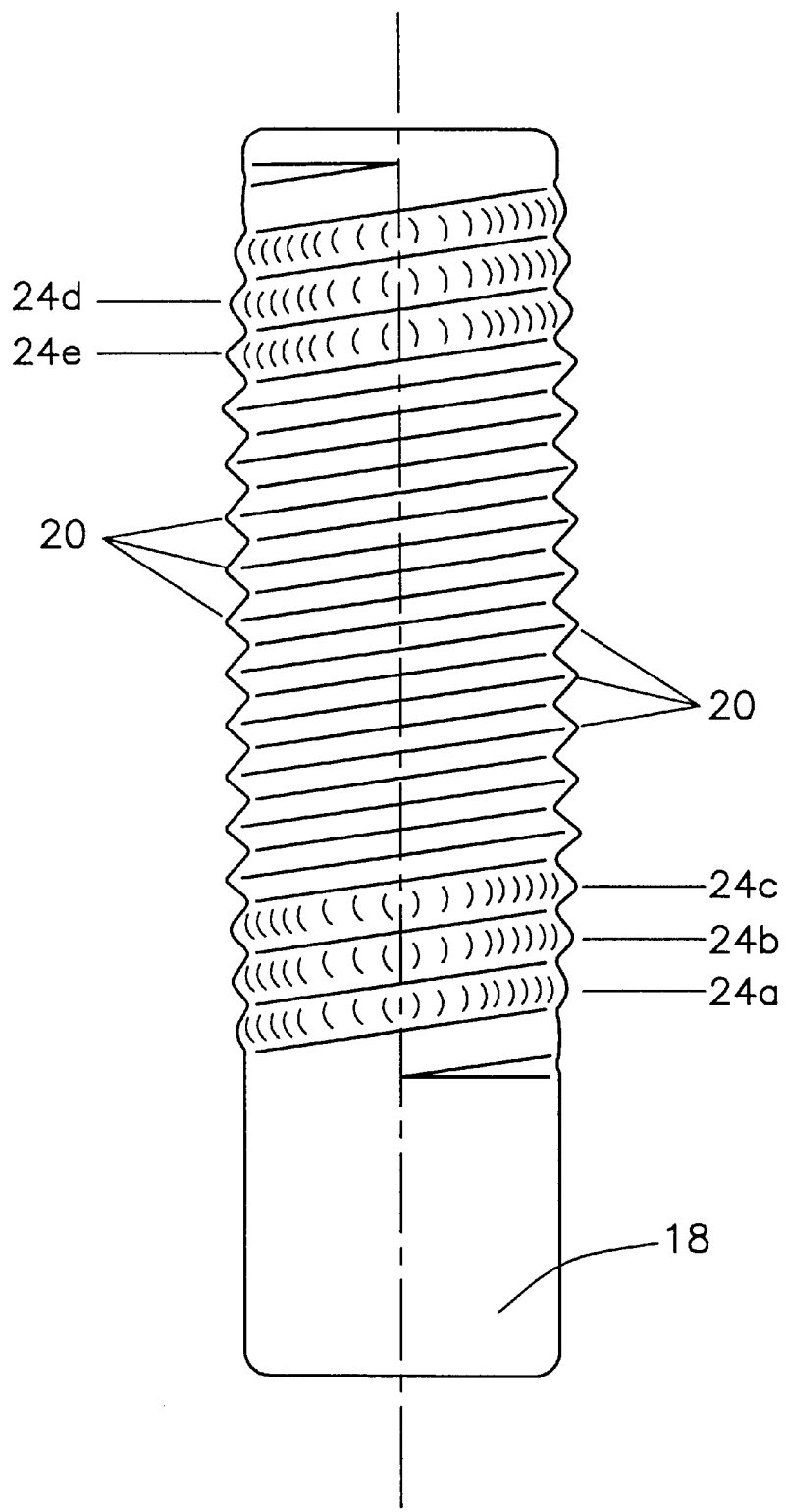
FIG. 2B illustrates a schematic elevational view of an embodiment of the present invention on a rod.

Referring now to FIG. 2B, a schematic elevational view of an embodiment of the present invention illustrates a rod. The rod is a substantially round shank member having first and second ends, and a plurality of threads 20 around the shank member. At least one thread 24a of the plurality of threads 20 is proximate to the first end and has a transitional surface from the minor diameter to the major diameter. At least one other thread 24d of the plurality of threads 20 is proximate to the second end of the shank member and has a transitional surface from the minor diameter to the major diameter. The at least one thread 24a or 24d is adapted to cam over mating threads of a receiving member (not illustrated) whereby the longitudinal axes of the shank and the receiving members become substantially collinearly aligned.

The threads have the same minor thread diameter as the other threads 20, but differ in that a curved surface is blended into the flanks of the threads 24a, 24b, 24c. The curved surface of the threads 24a, 24b, 24c may be round, parabolic or any other curved shape that may be easily rolled when forming the threads 22, 24a, 24b, 24c on the shank 16 (see FIGS. 5A–5D). The outside diameter of the primary transition thread 24a, 24b, 24c preferably does not exceed the pitch diameter and may start anywhere from the first transition thread 24a inward (24b and 24c). The outer diameter of the transition threads 24a, 24b, 24c are such as to allow them to easily cam over the first few inside threads of the nut 22 (FIG. 1). Once these transition threads 24a, 24b, 24c cam over during misalignment, the remaining external machine threads 20 are in substantially correct alignment with the mating internal threads of the nut 22 so that cross-threading does not occur.

Figure 3:
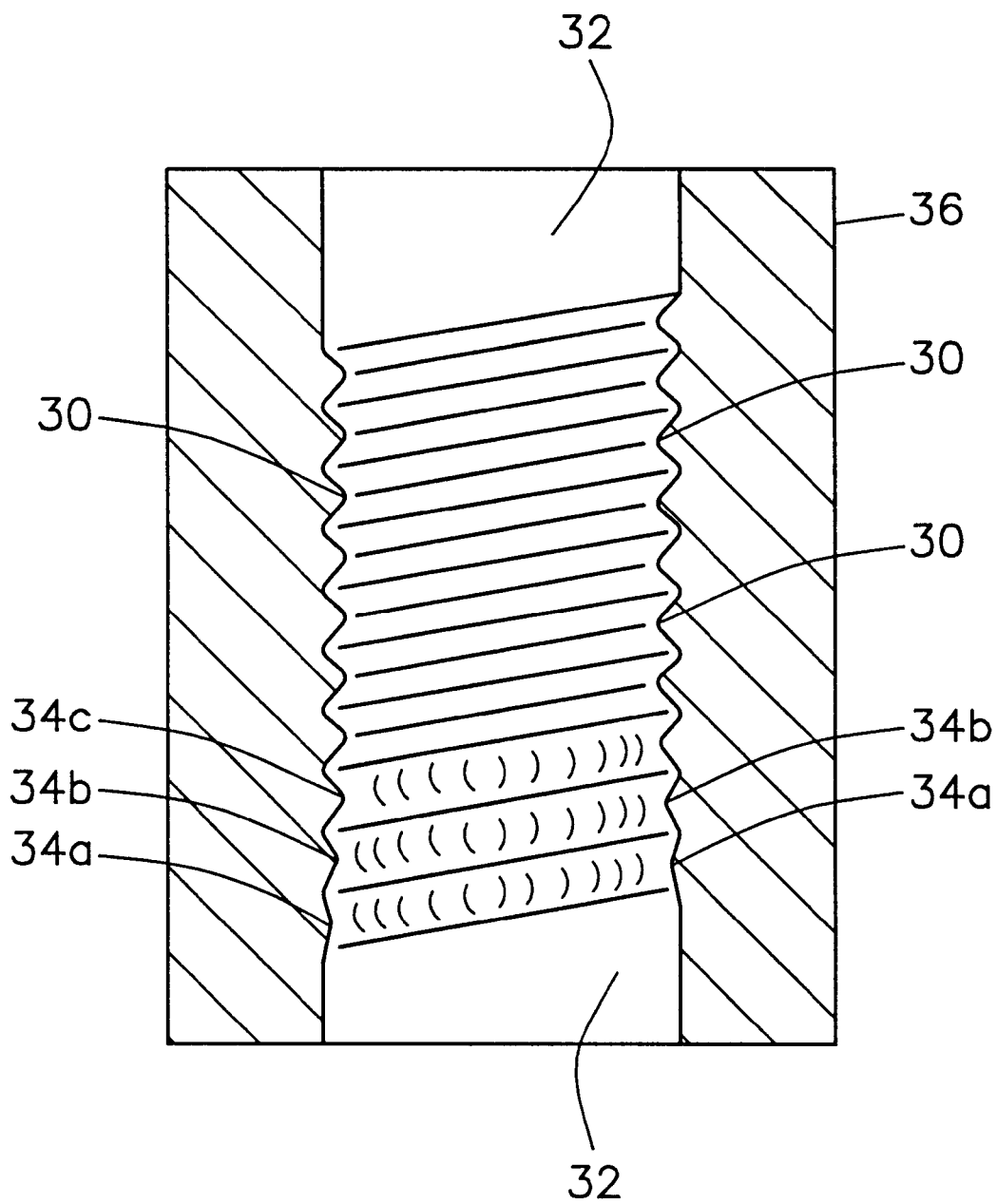
FIG. 3 illustrates a schematic cross section elevational view of internal threads according to the present invention.

Referring now to FIG. 3, a schematic cross section elevational view of a threaded nut is illustrated. An opening 32 in the nut 36 has internal threads 30 and 34a, 34b, 34c. The nut 36 comprises internal threads 30 which may be standard machine threads and at least one transitional thread 34a, 34b, 34c toward one end of the nut 36. Three transitional threads 34a, 34b and 34c are illustrated. Only one transitional thread 34a is necessary for operation of the present invention, however, two or more threads 34a, 34b, etc., may also be used with equally good results.

The threads 34a, 34b, 34c have the same major internal thread diameter as the other threads 30, but differ in that a transitional curved surface, and/or flat surfaces approximating the shape defined by the curved surface, is blended into the flanks of the threads 34a, 34b, 34c. The curved surface of the threads 34a, 34b, 34c may be round, parabolic, and/or flat surfaces approximating the shape defined by the curved surface which may be easily rolled when forming the threads 30, 34a, 34b, in the interior of the nut 36 (see FIGS. 5A–5D). The inner diameter of the primary transition thread 34a, 34b, 34c preferably does not exceed the pitch diameter and may start anywhere from the first transition thread 34a inward (34b and 34c). The inner diameter of the transition threads 34a, 34b, 34c are such as to allow them to easily cam over the first few inside threads of a shank 16 (see, generally FIG. 1). Once these transition threads 24a, 24b, 24c cam over during misalignment, the remaining internal threads 30 are in substantially correct alignment with the mating external threads of the shank 16 so that cross-threading does not occur.

Figure 4:
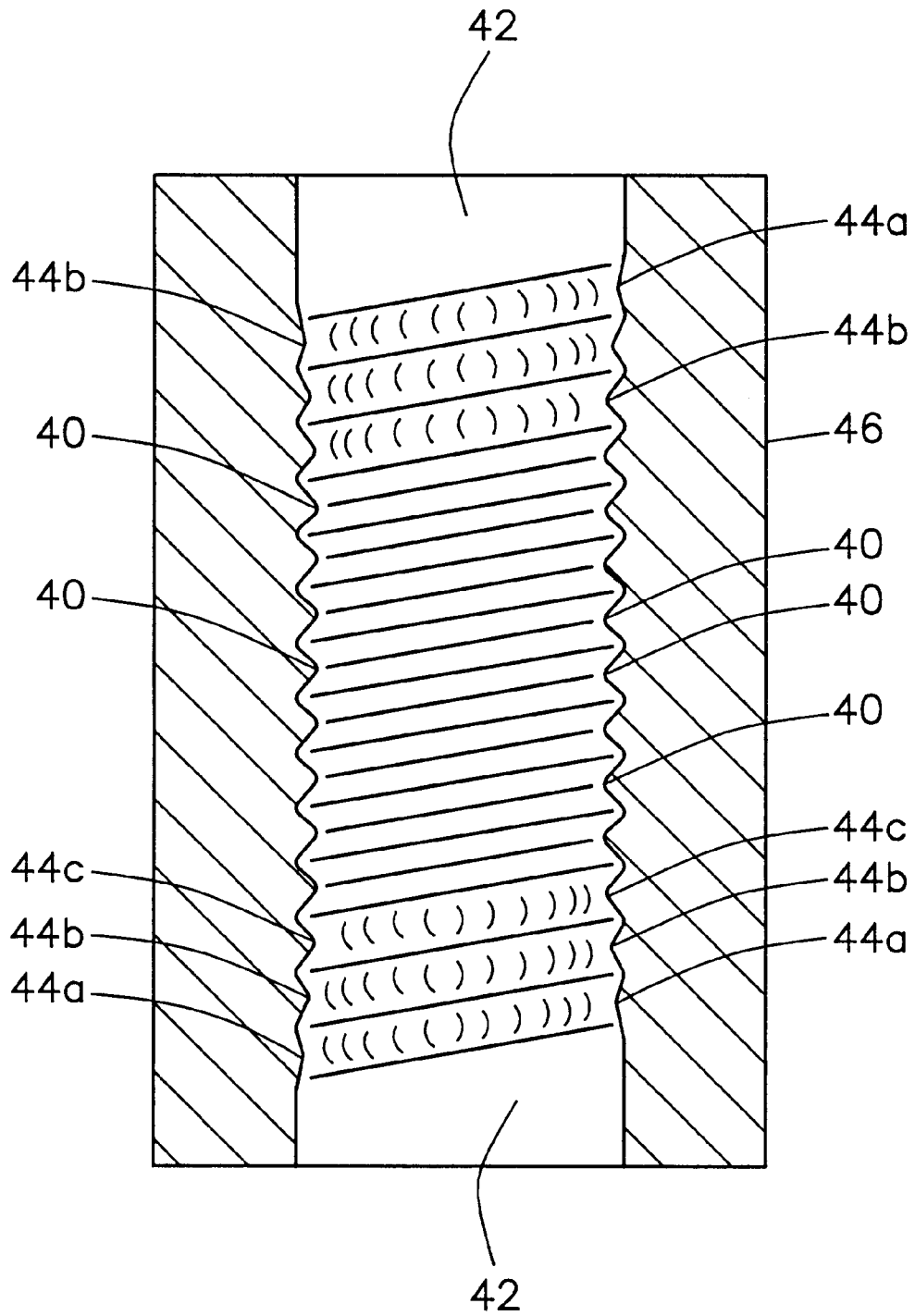
FIG. 4 illustrates a schematic cross section elevational view of another embodiment having internal threads according to the present invention.

Referring now to FIG. 4, a schematic cross section elevational view of another embodiment of a threaded nut is illustrated. An opening 42 in the nut 46 has internal threads 40 and 44a, 44b, 44c. The nut 46 comprises internal threads 40 which may be standard machine threads and at least one transitional thread 44a, 44b, 44c toward both ends of the nut 46. Three transitional threads 44a, 44b and 44c at each end of the nut 46 are illustrated. Only one transitional thread 44a is necessary for operation of the present invention, however, two or more threads 44a, 44b, etc., may also be used with equally good results. Operation of the nut 46 is substantially the same as disclosed above for the nut 36 except that nut 46 need not have a preferred anti-cross-threading end when engaging a shank (not illustrated). Thus, having to observe proper end orientation of the nut 46 is unimportant for operation of this embodiment of the present invention, or the nut 46 may be used as a coupling between two externally threaded rods, shanks, bolts and the like.

Figure 5A:
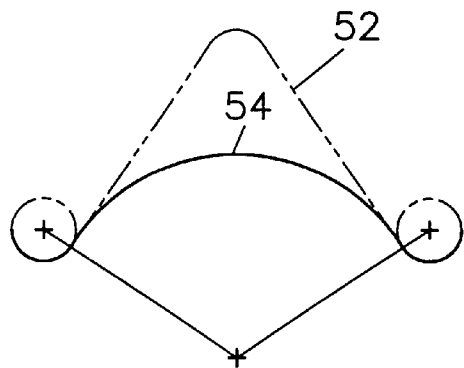
FIGS. 5A–5D illustrate various embodiments of the transitional curved surface of the present invention.
Figure 5B:
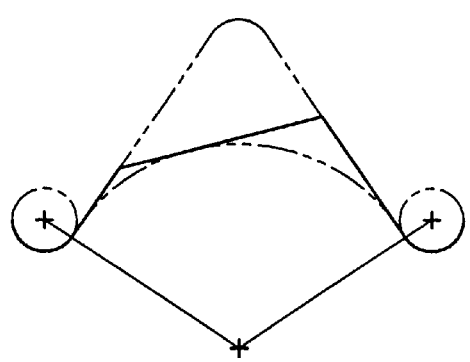
Figure 5C:
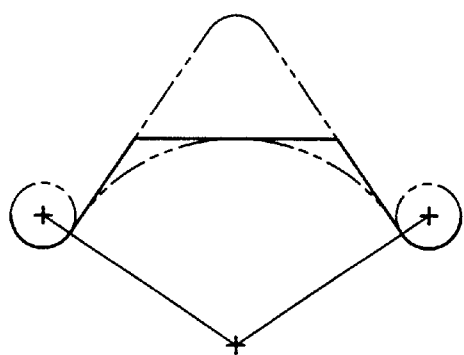
Figure 5D:
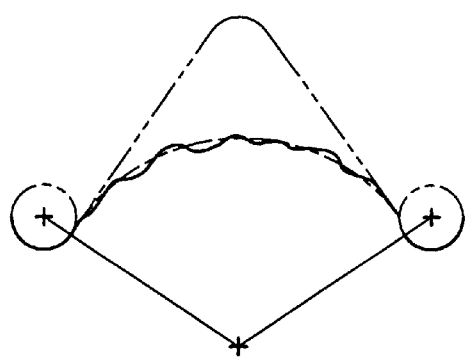

Referring now to FIGS. 5A–5D, various embodiments of the transitional curved surface of the present invention are illustrated. A typical machine thread is illustrated by the dashed line 52 and the transitional curved thread of the present invention is illustrated by the solid line 54. The lead threads (external or internal), as disclosed above, have transitional curved surfaces. These transitional curved surfaces may be preferably implemented as follows: FIG. 5A illustrates a smoothly curving profile for the transitional surface. FIG. 5B illustrates an angled crest flat for the transitional surface. FIG. 5C illustrates a flat truncated crest for the transitional surface. FIG. 5D illustrates a series of flats/curved surfaces approximating the transitional curved surface of FIG. 5A. Many other embodiments of the transitional curved surface may be implemented and are contemplated herein The threads 20, 24a, 24b, 24c on shank 16 (FIG. 2), threads 30, 34a, 34b, 34c on nut 36 (FIG. 3), and threads 40, 44a, 44b, 44c on nut 46 (FIG. 4) may be formed by rolling, cutting, burnishing, grinding, machining, polishing, laser or any combination thereof. A novel aspect of the present invention is the use of a special thread roll die having the desired curvature for the transitional threads as well as the machine threads to be formed on a blank tubular shank or internal opening in a nut. The special thread roll die may be used with a standard thread rolling machine to produce the novel features of the present invention. The special thread roll die has a mirror image of the desired threads 20, 24a, 24b, 24c so that when the blank shank is rolled to produce threads thereon, the desired curvature and radius on the transition threads are also produced. A threaded tap having a mirror image of the desired curvature transitional threads as well as the machine threads may be used to form the threads, as disclosed above, for the nut 36.

The present invention, therefore, is well adapted to carry out the objects and attain the ends and advantages mentioned, as well as others inherent therein. While a presently preferred embodiment of the invention has been given for purposes of disclosure, numerous changes in the details of procedures for accomplishing the desired results, will readily suggest themselves to those skilled in the art, and which are encompassed within the spirit of the invention and the scope of the appended claims.

What is claimed is:

1. An anti-cross threading fastener, comprising:
   a substantially round shank member having first and second ends and a continuous helix comprised of a plurality of threads around a circumference of said shank member, the plurality of threads being adapted to mate with corresponding threads of a receiving member;
   at least one thread of the plurality of threads proximate the first end of said shank member and having an outside diameter and a surface;
   the remaining plurality of threads having a major diameter; and
   the outside diameter of the at least one thread is smaller than the major diameter of the remaining plurality of threads, and the surface of the at least one thread approximates a shape defined by a curve extending from a curve forming the minor diameter to about the pitch diameter of the remaining plurality of threads.

2. The anti-cross threading fastener of claim 1, wherein the surface of the at least one thread composes at least one flat surface.

3. The anti-cross threading fastener of claim 1, wherein the surface of the at least one thread approximates a shape defined by a curve extending from a curve forming the minor diameter at a first side of the at least one thread to about the pitch diameter of the remaining plurality of threads, and from about the pitch diameter of the remaining plurality of threads to a curve forming the minor diameter at a second side of the at least one thread.

4. The anti-cross threading fastener of claim 3, wherein the surface of the at least one thread comprises two opposing flat surfaces.

5. The anti-cross threading fastener of claim 4, wherein the two opposing flat surfaces join at a pointed crest.

6. The anti-cross threading fastener of claim 4, wherein the two opposing flat surfaces join at a rounded crest.

7. The anti-cross threading fastener of claim 4, wherein the two opposing flat surfaces join at a flat crest.

8. The anti-cross threading fastener of claim 1, further comprising a protruding diameter member attached to and collinear with the first end of said shank member.

9. The anti-cross threading fastener of claim 8, wherein said protruding diameter member has a diameter that is equal to about 90 percent of a minor diameter of the plurality of threads and a length that is equal to about one diameter of said shank member.

10. An anti-cross threading fastener, comprising:
    a substantially round shank member having first and second ends and a continuous helix comprised of a plurality of threads around a circumference of said shank member, the plurality of threads being adapted to mate with corresponding threads of a receiving member;
    at least one thread of the plurality of threads proximate the first end of said shank member and hang an outside diameter;
    the remaining plurality of threads having a major diameter, wherein the remaining plurality of threads comprise a thread angle of about 60 degrees; and
    the outside diameter of the at least one thread is smaller than the major diameter of the remaining plurality of threads, and the at least one thread has a thread angle of greater than about 60 degrees.

11. The anti-cross threading fastener of claim 10, wherein the at least one thread transitions from a thread angle of greater than about 60 degrees into the remaining plurality of threads having a tread angle of about 60 degrees.

12. An anti-cross threading fastener, comprising:
    a substantially round shank member having first and second ends and a continuous helix comprised of a plurality of threads around a circumference of said shank member, the plurality of threads having a constant minor diameter and the plurality of threads being adapted to mate with corresponding threads of a receiving member;
    at least one thread of the plurality of threads proximate the first end of said shank member and having an outside diameter and a surface;
    the remaining plurality of threads having a major diameter; and
    the outside diameter of the at least one thread is smaller than the major diameter of the remaining plurality of threads, and the surface of the at least one thread is smoothly curved and approximates a shape defined by a curve from the curve forming the minor diameter to the outside diameter.

13. The anti-cross threading fastener of claim 12, wherein the surface of the at least one thread approximates a shape defined by a curve extending from a curve forming the minor diameter at a first side of the at least one thread, to the outside diameter, and from the outside diameter to a curve forming the minor diameter at a second side of the at least one thread.

14. The anti-cross threading fastener of claim 12, wherein the outside diameter is about the pitch diameter of the remaining plurality of threads.

15. An anti-cross threading fastener, comprising:
a substantially round shank member having first and second ends and a continuous helix comprised of a plurality of threads around a circumference of said shank member, the plurality of threads having a constant minor diameter and the plurality of threads being adapted to mate with corresponding threads of a receiving member;
at least one thread of the plurality of threads having proximate the first end of said shank member and having an outside diameter and a surface;
the remaining plurality of threads having a major diameter; and
the outside diameter of the at least one thread is smaller than the major diameter of the remaining plurality of threads, and the surface of the at least one thread is a curved shape approximated by at least one surface select, from flat and curved surfaces and has a profile which fits within a profile of a thread of the remaining plurality of threads.

16. The anti-cross threading fastener of claim 15, wherein the surface of the at least one thread is a curved shape approximated by two opposing flat surfaces.

17. The anti-cross threading fastener of claim 15, wherein the two opposing flat surfaces join at a pointed crest.

18. The anti-cross threading fastener of claim 15, wherein the two opposing flat surfaces join at a mounded crest.

19. The anti-cross threading fastener of claim 15, wherein the two opposing flat surfaces join at a flat crest.

20. The anti-cross threading fastener of claim 15, wherein the remaining plurality of treads comprise standard machine threads having a thread angle of about 60 degrees, and wherein the at least one thread has a thread angle of greater than about 60 degrees.

21. The anti-cross threading fastener of claim 20, wherein the at least one thread transitions from a thread angle of greater than about 60 degrees into the remaining plurality of threads having a thread angle of about 60 degrees.

* * * * *